(12) United States Patent
Youm

(10) Patent No.: US 10,205,162 B2
(45) Date of Patent: Feb. 12, 2019

(54) NEGATIVE ACTIVE MATERIAL FOR RECHARGEABLE LITHIUM BATTERY, METHOD OF PREPARING SAME AND RECHARGEABLE LITHIUM BATTERY INCLUDING SAME

(71) Applicant: SAMSUNG SDI CO., LTD., Yongin-si, Gyeonggi-do (KR)

(72) Inventor: Chul Youm, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 411 days.

(21) Appl. No.: 14/980,714

(22) Filed: Dec. 28, 2015

(65) Prior Publication Data

US 2016/0211514 A1   Jul. 21, 2016

(30) Foreign Application Priority Data

Jan. 15, 2015  (KR) ........................ 10-2015-0007610

(51) Int. Cl.

| H01M 4/36 | (2006.01) |
| H01M 4/04 | (2006.01) |
| H01M 4/134 | (2010.01) |
| H01M 4/1395 | (2010.01) |
| H01M 4/38 | (2006.01) |
| H01M 4/62 | (2006.01) |

(Continued)

(52) U.S. Cl.
CPC .......... *H01M 4/366* (2013.01); *H01M 4/043* (2013.01); *H01M 4/0471* (2013.01); *H01M 4/134* (2013.01); *H01M 4/1395* (2013.01); *H01M 4/386* (2013.01); *H01M 4/583* (2013.01); *H01M 4/625* (2013.01); *H01M 10/0525* (2013.01)

(58) Field of Classification Search
CPC ...... H01M 4/366; H01M 4/134; H01M 4/386; H01M 4/625; H01M 4/583; H01M 4/1395; H01M 4/043; H01M 4/0471; H01M 10/0525
See application file for complete search history.

(56) References Cited

U.S. PATENT DOCUMENTS

| 2009/0208844 A1 | 8/2009 | Kepler et al. |
| 2009/0269669 A1 | 10/2009 | Kim et al. |

(Continued)

FOREIGN PATENT DOCUMENTS

| JP | 2009-266795 A | 11/2009 |
| JP | 2014-029833 A | 2/2014 |

(Continued)

OTHER PUBLICATIONS

Huang, et al., "Si Nanoparticles Intercalated into Interlayers of Slightly Exfoliated Graphite Filled by Carbon as Anode with High Volumetric Capacity for Lithium-ion Battery", Electrochimica Acta, vol. 184, Aug. 21, 2015, pp. 364-370.

(Continued)

*Primary Examiner* — Laura Weiner

(74) *Attorney, Agent, or Firm* — Lee & Morse, P.C.

(57) ABSTRACT

A negative active material for a rechargeable lithium battery, a method of preparing a negative active material for a rechargeable lithium battery, and a rechargeable lithium battery, the negative active material including a silicon-graphite composite, wherein the silicon-graphite composite includes a graphite particle, a silicon particle inside the graphite particle, and amorphous carbon inside the graphite particle.

14 Claims, 10 Drawing Sheets

(51) Int. Cl.
*H01M 4/583* (2010.01)
*H01M 10/0525* (2010.01)

(56) References Cited

U.S. PATENT DOCUMENTS

| | | |
|---|---|---|
| 2010/0273058 A1 | 10/2010 | Lee et al. |
| 2010/0285359 A1 | 11/2010 | Hwang et al. |
| 2013/0089784 A1 | 4/2013 | Cho et al. |
| 2013/0209881 A1 | 8/2013 | Do et al. |
| 2013/0334468 A1 | 12/2013 | Taniguchi et al. |
| 2014/0087255 A1 | 3/2014 | Kim et al. |

FOREIGN PATENT DOCUMENTS

| | | |
|---|---|---|
| KR | 10-2002-0070764 A | 9/2002 |
| KR | 10-2007-0113066 A | 11/2007 |
| KR | 10-2013-0037090 A | 4/2013 |
| KR | 10-2013-0049018 A | 5/2013 |
| KR | 10-2013-0094366 A | 8/2013 |
| KR | 10-2014-0039603 A | 4/2014 |

OTHER PUBLICATIONS

Extended European Search Report dated May 19, 2016 in Corresponding European Patent Application No. 16151363.5.
European Examination Report (Office action) dated Jul. 17, 2017 in corresponding European Patent Application No. 16151363.5.

NEGATIVE ACTIVE MATERIAL FOR RECHARGEABLE LITHIUM BATTERY, METHOD OF PREPARING SAME AND RECHARGEABLE LITHIUM BATTERY INCLUDING SAME

CROSS-REFERENCE TO RELATED APPLICATION

Korean Patent Application No. 10-2015-0007610, filed on Jan. 15, 2015, in the Korean Intellectual Property Office, and entitled: "Negative Active Material for Rechargeable Lithium Battery, Method of Preparing Same and Rechargeable Lithium Battery Including Same," is incorporated by reference herein in its entirety.

BACKGROUND

1. Field

Embodiments relate to a negative active material for a rechargeable lithium battery, a method of preparing the same, and a rechargeable lithium battery including the same.

2. Description of the Related Art

Rechargeable lithium batteries have recently drawn attention as a power source for small portable electronic devices. Rechargeable lithium batteries may use an organic electrolyte and thereby may have twice or more of discharge voltage than that of other batteries using an alkaline aqueous solution. Accordingly, rechargeable batteries have high energy density.

Such a rechargeable lithium battery may be manufactured by injecting an electrolyte into an electrode assembly, which includes a positive electrode including a positive active material capable of intercalating/deintercalating lithium ions and a negative electrode including a negative active material capable of intercalating/deintercalating lithium ions.

SUMMARY

Embodiments are directed to a negative active material for a rechargeable lithium battery, a method of preparing the same, and a rechargeable lithium battery including the same.

The embodiments may be realized by providing a negative active material for a rechargeable lithium battery, the negative active material including a silicon-graphite composite, wherein the silicon-graphite composite includes a graphite particle, a silicon particle inside the graphite particle, and amorphous carbon inside the graphite particle.

The silicon-graphite composite may further include a silicon particle on a surface of the graphite particle.

An amount of the silicon particle inside the graphite particle may be about 30 wt % to about 70 wt %, based on a total weight of the silicon particles present inside and on the surface of the graphite particle.

A total amount of the silicon particle present inside and on the surface of the graphite particle may be about 15 wt % to about 60 wt %, based on a total weight of the silicon-graphite composite.

The graphite particle may include expanded graphite.

The amorphous carbon inside the graphite particle may be included in an amount of about 5 wt % to about 40 wt %, based on a total weight of the silicon-graphite composite.

The negative active material may further include a coating layer surrounding the silicon-graphite composite, wherein the coating layer includes amorphous carbon.

The negative active material may have a specific surface area of about 1 $m^2/g$ to about 10 $m^2/g$.

The embodiments may be realized by providing a method of preparing a negative active material for a rechargeable lithium battery, the method including mixing a graphite particle, a silicon particle, and amorphous carbon raw material to obtain a silicon-graphite composite precursor; and compression-forming the silicon-graphite composite precursor to obtain a silicon-graphite composite.

The compression-forming may include pressing the silicon-graphite composite precursor at a pressure of about 2 MPa to about 10 MPa.

The graphite particle may include expanded graphite.

The expanded graphite may be prepared by performing an expansion process for about 1 hour to about 20 hours.

The method may further include mixing the silicon-graphite composite and amorphous carbon raw material to obtain a mixture; and firing the mixture such that a coating layer is formed on the silicon-graphite composite.

The graphite particle may have an average particle diameter of about 5 μm to about 20 μm, and the silicon particle may have an average particle diameter of about 50 nm to about 300 nm.

The amorphous carbon raw material may include sucrose, methylene diphenyl diisocyanate, polyurethane, a phenolic resin, a naphthalene resin, polyvinyl alcohol, polyvinylchloride, furfuryl alcohol, polyacrylonitrile, polyamide, furan resin, cellulose, styrene, polyimide, an epoxy resin, a vinyl chloride resin, coal-based pitch, petroleum-based pitch, mesophase pitch, tar, low molecular weight heavy oil, or a combination thereof.

The embodiments may be realized by providing a negative active material for a rechargeable lithium battery, the negative active material being prepared according to a method of an embodiment.

The embodiments may be realized by providing a rechargeable lithium battery comprising a negative electrode, the negative electrode including the negative active material according to an embodiment.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1A:
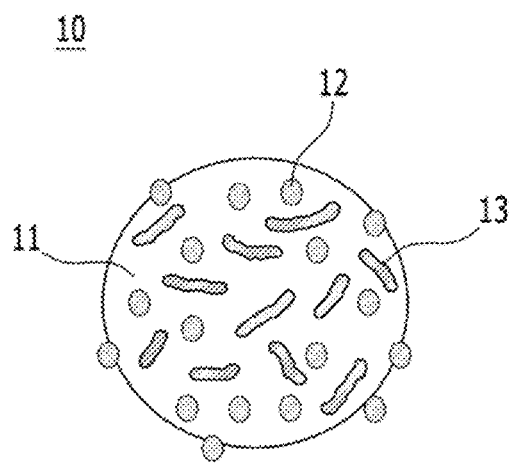
FIG. 1A illustrates a schematic view of a structure of a negative active material for a rechargeable lithium battery according to one embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Hereinafter, a negative active material for a rechargeable lithium battery according to one embodiment is described referring to FIGS. 1A and 1B.

FIG. 1A illustrates a schematic view of a structure of a negative active material for a rechargeable lithium battery according to one embodiment.

Referring to FIG. 1A, a negative active material for a rechargeable lithium battery according to one embodiment may include a silicon-graphite composite 10. The silicon-graphite composite 10 may include, e.g., a graphite particle 11, a silicon (Si) particle 12 inside the graphite particle 11, and amorphous carbon 13 inside the graphite particle 11.

In an implementation, the negative active material may further include a coating layer surrounding the silicon-graphite composite 10. This is described referring to FIG. 1B.

Figure 1B:
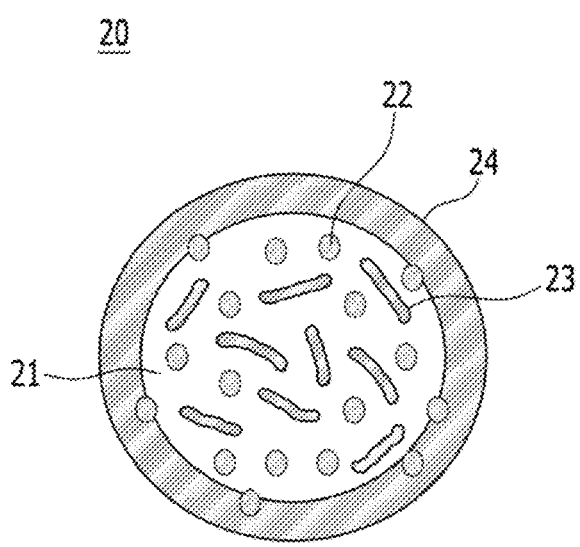
FIG. 1B illustrates a schematic view of a structure of a negative active material for a rechargeable lithium battery according to another embodiment.

FIG. 1B illustrates a schematic view of a structure of a negative active material for a rechargeable lithium battery according to another embodiment.

Referring to FIG. 1B, a negative active material 20 for a rechargeable lithium battery according to another embodiment may include, e.g., a silicon-graphite composite and a coating layer 24 surrounding the silicon-graphite composite. The silicon-graphite composite may include a graphite particle 21, a silicon particle 22 inside the graphite particle 21, and amorphous carbon 23 inside the graphite particle 21.

As shown in FIGS. 1A and 1B, the silicon-graphite composite may include a silicon particle inside the graphite particle. For example, the silicon particle may be positioned inside the graphite particle and may help prevent a sharp cycle-life degradation (which may otherwise occur due to high reactivity between the negative active material and an electrolyte) and also may help prevent an increase in resistance. In addition, the silicon-graphite composite in the negative active material may help minimize the expansion of a negative electrode (which may otherwise occur due to volume expansion of the silicon (Si) during charging).

The silicon-graphite composite including the silicon particle inside the graphite particle may be manufactured by a compression-forming process. This manufacturing method will be described in greater detail below.

In an implementation, the silicon-graphite composite may further include a silicon (Si) particle on a surface of the graphite particle. For example, the silicon particle may be present on the surface of the graphite particle as well as inside the graphite particle.

An amount of the silicon particle inside the graphite particle may be about 30 wt % to about 70 wt %, e.g., about 40 wt % to about 70 wt %, based on a total weight of the silicon particle present inside and on the surface of the graphite particle, e.g., a total weight of silicon particles of the silicon-graphite composite. The content may indicate the inclusion ratio of the silicon particle which is a ratio of silicon in the composite. When the inclusion ratio of the silicon particle is within the range, cycle-life characteristics may be further improved.

A total amount of the silicon particle present inside and on the surface of the graphite particle may be about 15 wt % to about 60 wt %, e.g., about 30 wt % to about 50 wt %, based on a total weight of the silicon-graphite composite, e.g., based on a total weight of the graphite particle, the silicon particle, and amorphous carbon. When the silicon particles are included within the range, high capacity and excellent cycle-life characteristics of a rechargeable lithium battery cell may be simultaneously realized.

The silicon particle may have an average particle diameter of about 50 nm to about 300 nm, e.g., about 80 nm to about 200 nm. When the silicon particle has an average particle diameter within the range, the silicon may be suppressed from a volume expansion due to smooth in-and-out of lithium ions and low ion resistance, and cycle-life characteristics may be improved.

The graphite particle may include, e.g., natural graphite, expanded graphite, artificial graphite, or a combination thereof. The graphite particle may be a particle having various shapes, e.g., sheet-shape, spherical shape, or the like, or may be an assembled spheroidal particle. In an implementation, the graphite particle may be, e.g., expanded graphite.

When the expanded graphite is used as the graphite particle, a silicon-graphite composite including a silicon particle inside the graphite particle may be manufactured, and the content of the silicon particle inside the graphite particle may be further increased. For example, the expanded graphite may increase the inclusion ratio of the silicon particle and thus, may help improve cycle-life characteristics and minimize expansion of a negative electrode during the charge.

The graphite particle may have an average particle diameter of about 5 μm to about 20 μm, e.g., about 5 μm to about 17 μm. When the graphite particle has an average particle diameter within the range, the graphite particle may have an excellent buffering effect against volume expansion of the silicon particle and excellent electrical conductivity.

The graphite particle may be included in an amount of about 15 wt % to about 70 wt %, e.g., about 20 wt % to about 50 wt %, based on the total weight of the silicon-graphite composite, e.g., based on the total amount of the graphite particle, the silicon particle, and amorphous carbon. When the graphite particle is included within the range, the graphite particle has a higher buffering effect against volume expansion of the silicon particle and may apply excellent electrical conductivity and improve cycle-life characteristics.

As shown in FIGS. 1A and 1B, the silicon-graphite composite may include amorphous carbon inside the graphite particle. For example, the amorphous carbon may be present inside the graphite particle and thus, may help suppress volume expansion of the silicon particle and may help improve cycle-life characteristics of a rechargeable lithium battery.

A silicon-graphite composite including amorphous carbon inside a graphite particle may be manufactured by mixing a silicon particle and a graphite particle with an amorphous carbon raw material. In other words, the amorphous carbon raw material may be mixed with the silicon particle and the graphite particle and the compression-forming is performed, before coating the silicon-graphite composite with the amorphous carbon, and the amorphous carbon may be uniformly distributed inside the graphite particle, e.g., deep inside the graphite particle.

For example, the amorphous carbon inside the graphite particle may be included in an amount of about 5 wt % to about 40 wt %, e.g., about 7 wt % to about 30 wt %, based on the total weight of the silicon-graphite composite, e.g., based on the total amount of the graphite particle, the silicon particle, and amorphous carbon. When the amorphous carbon is included within the range, volume expansion of the silicon particle may be suppressed and thus, cycle-life characteristics of a rechargeable lithium battery may be improved.

The amorphous carbon may include, e.g., soft carbon, hard carbon, mesophase pitch carbonized product, fired coke, or the like, and may be used singularly or as a mixture of two or more.

The silicon-graphite composite may have an average particle diameter of about 10 μm to about 25 μm, e.g., about 10 μm to about 20 μm. When the silicon-graphite composite has an average particle diameter within the range, cycle-life characteristics of a rechargeable lithium battery may be improved.

In an implementation, the negative active material may include a coating layer surrounding the silicon-graphite composite as shown in FIG. 1B. The coating layer may include, e.g., amorphous carbon. For example, the amorphous carbon may be the same as the amorphous carbon included in the silicon-graphite composite, and thus the descriptions therefor may be omitted.

The coating layer may have a thickness of about 0.1 μm to about 2 μm, e.g., about 0.5 μm to about 1 μm. When the coating layer has a thickness within the range, the coating layer may surround the silicon-graphite composite and may firmly bond the graphite particle, the silicon particle, and the amorphous carbon included in the silicon-graphite composite. Accordingly, the coating layer may play a role of buffering against volume expansion of the silicon particle, along with the graphite particle, during the charge and discharge, and may further improve cycle-life characteristics.

In an implementation, a negative active material manufactured in a compression-forming method may decrease a pore, e.g., a size of a pore, inside the silicon-graphite composite. In an implementation, the negative active material may have a specific surface area of about 1 $m^2/g$ to about 10 $m^2/g$, e.g., about 4 $m^2/g$ to about 8 $m^2/g$ or about 4 $m^2/g$ to about 6 $m^2/g$. When the negative active material has a specific surface area within the range, a rechargeable lithium battery having excellent cycle-life characteristics may be realized.

Hereinafter, a method of manufacturing the negative active material is described.

First, a graphite particle, a silicon particle, and an amorphous carbon raw material may be mixed, obtaining a silicon-graphite composite precursor. The mixing process may be performed by using a solvent such as ethanol, tetrahydrofuran, propyl alcohol, or a combination thereof. Subsequently, the silicon-graphite composite precursor may be compression-formed to manufacture a silicon-graphite composite. In an implementation, the obtained silicon-graphite composite may be ground for use. In an implementation, the silicon-graphite composite and the amorphous carbon raw material may be mixed and then fired to manufacture the silicon-graphite composite coated with the amorphous carbon as a negative active material. In an implementation, the obtained negative active material may be ground for use.

The graphite particle may be expanded graphite as described above. The expanded graphite may be manufactured by performing an expansion process. The expansion process may be understood referring to FIG. 2.

Figure 2:
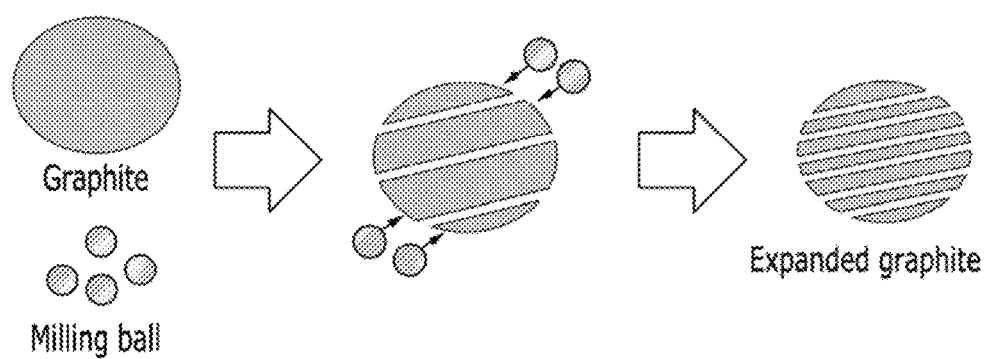
FIG. 2 illustrates a schematic view of an expansion process for obtaining expanded graphite.

FIG. 2 illustrates a schematic view of an expansion process for obtaining expanded graphite.

Referring to FIG. 2, the expansion process may be performed by using a milling ball. For example, a graphite layer may be separated by energy generated when the milling ball is collided with the graphite.

In an implementation, the expansion process may be performed for about 1 hour to about 20 hours, e.g., about 10 hours to about 20 hours. When the expansion process is performed within the time range, the content of the silicon present in the graphite particle, e.g., the inclusion ratio of the silicon may be increased, and thus, cycle-life characteristics may be further improved.

The amorphous carbon raw material used for the silicon-graphite composite precursor and the amorphous carbon raw material for coating the silicon-graphite composite may independently include, e.g., sucrose, methylene diphenyl diisocyanate, polyurethane, a phenolic resin, a naphthalene resin, polyvinyl alcohol, polyvinylchloride, furfuryl alcohol, polyacrylonitrile, polyamide, furan resin, cellulose, styrene, polyimide, an epoxy resin, a vinyl chloride resin, coal-based pitch, petroleum-based pitch, mesophase pitch, tar, low molecular weight heavy oil, or a combination thereof.

The compression-forming may be performed by compressing the silicon-graphite composite precursor at a pressure of about 2 MPa to about 10 MPa, e.g., about 3 MPa to about 9 MPa, in a mold. When compression-forming within the pressure range, the content of silicon present inside the graphite particle, e.g., the inclusion ratio of the silicon may be increased, and thus, cycle-life characteristics may be further improved.

The firing may be performed at about 500° C. to about 950° C., e.g., at about 550° C. to about 900° C. When firing within the temperature range, impurities may be removed from the starting materials during the firing process (i.e., carbonization process), and thus, irreversible capacity may be decreased, improving charge and discharge characteristics.

The heat treatment may be performed under an atmosphere including nitrogen, argon, hydrogen, or a mixed gas thereof, or under vacuum.

Hereinafter, a rechargeable lithium battery including the negative active material is described referring to FIG. 3.

Figure 3:
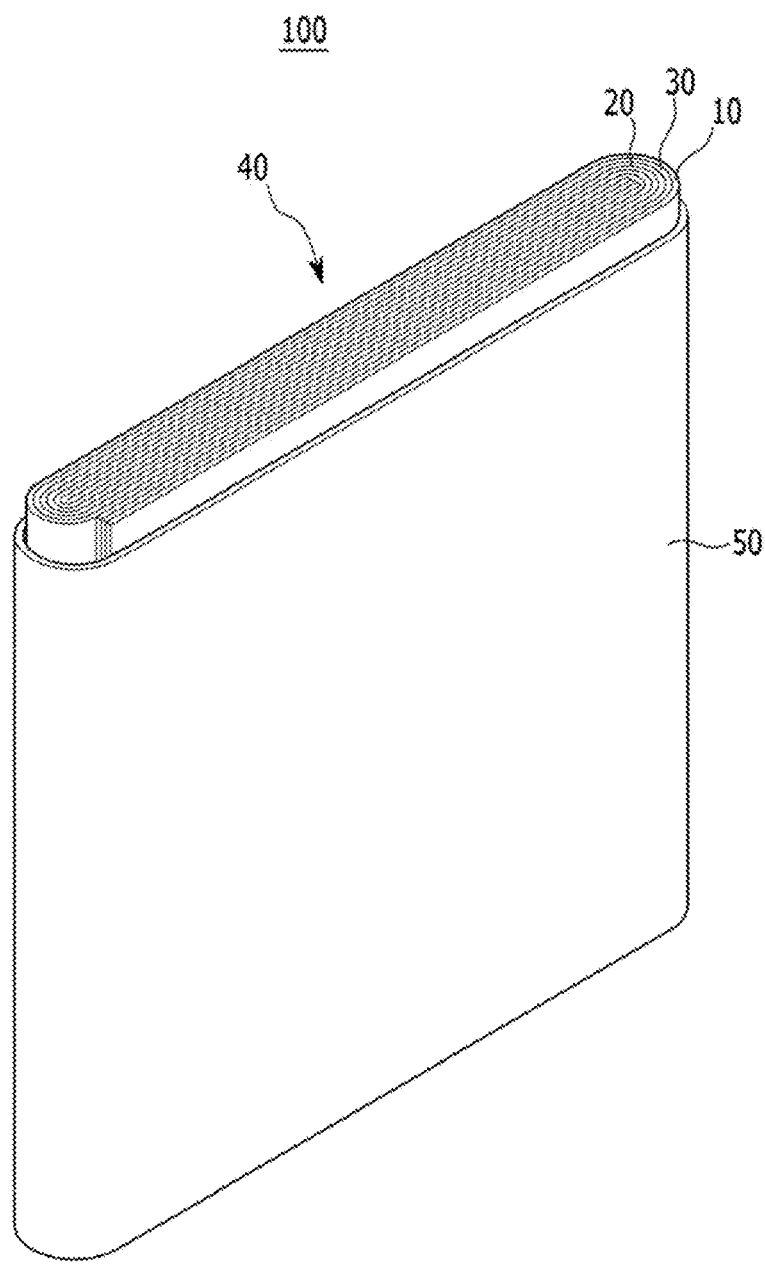
FIG. 3 illustrates an exploded perspective view of a rechargeable lithium battery according to one embodiment.

FIG. 3 illustrates an exploded perspective view showing a rechargeable lithium battery according to one embodiment. A prismatic rechargeable lithium battery according to one embodiment is described as an example. In an implementation, the active material according to an embodiment may be applicable to various batteries such as a lithium polymer battery, a cylindrical battery, and the like.

Referring to FIG. 3, a rechargeable lithium battery 100 according to one embodiment may include an electrode assembly 40 manufactured by winding a separator 30 interposed between a positive electrode 10 and a negative electrode 20 and a case 50 housing the electrode assembly 40. An electrolyte may be impregnated in the positive electrode 10, the negative electrode 20, and the separator 30.

The negative electrode 20 may include a negative current collector and a negative active material layer formed on the negative current collector.

The current collector may be, e.g., a copper foil, a nickel foil, a stainless steel foil, a titanium foil, a nickel foam, a copper foam, a polymer substrate coated with a conductive metal, or a combination thereof.

The negative active material layer may include a negative active material. In an implementation, the negative active material layer may further include a binder and/or a conductive material. The negative active material may be the same as described above.

The binder may help improve binding properties of negative active material particles with one another and with a current collector. Examples of the binder may be a non-water-soluble binder, a water-soluble binder, or a combination thereof.

The non-water-soluble binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The water-soluble binder may be a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof.

When the water-soluble binder is used as the positive electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of about 0.1 to about 3 parts by weight based on 100 parts by weight of the negative active material.

The conductive material may help improve conductivity of an electrode. A suitable electrically conductive material that does not cause a chemical change may be used as a conductive material. Examples of the conductive material may include a carbon-based material such as natural graphite, artificial graphite, carbon black, acetylene black, ketjen black, a carbon fiber and the like; a metal-based material such as a metal powder or a metal fiber and the like of copper, nickel, aluminum, silver, and the like; a conductive polymer such as a polyphenylene derivative and the like; or a mixture thereof.

The positive electrode 10 may include a current collector and a positive active material layer formed on the current collector. The positive active material layer may include a positive active material. In an implementation, the positive active material layer may further include a binder and/or a conductive material.

The current collector may include, e.g., Al (aluminum).

The positive active material may include lithiated intercalation compounds that reversibly intercalate and deintercalate lithium ions. For example, at least one composite oxide of lithium and a metal of cobalt, manganese, nickel, or a combination thereof may be used. Examples thereof may include a compound represented by one of the following Chemical Formulae:

$Li_aA_{1-b}B_bD_2$ (0.90≤a≤1.8 and 0≤b≤0.5); $Li_aE_{1-b}B_bO_{2-c}D_c$(0.90≤a≤1.8, 0≤b≤0.5, 0≤c≤0.05); $Li_aE_{2-b}B_bO_{4-c}D_c$ (0.90≤a≤1.8 0≤b≤0.5, 0≤c≤0.05); $Li_aNi_{1-b-c}Co_bB_cD_\alpha$ (0.90≥a≥1.8, 0≤b≤0.5, 0≤c≤0.05, 0<α≤2); $Li_aNi_{1-b-c}Co_bB_cO_{2-\alpha}F_\alpha$ (0.90≤a≤1.8, 0≤b≤0.5, 0≤c≤0.05, 0<α<2); $Li_aNi_{1-b-c}Co_bB_cO_{2-\alpha}F_2$ (0.90≤a≤1.8, 0≤b≤0.5, 0≤c≤0.05, 0<α<2); $Li_aNi_{1-b-c}Mn_bB_cD_\alpha$ (0.90≤a≤1.8, 0≤b≤0.5, 0≤c≤0.05, 0<α<2); $Li_aNi_{1-b-c}Mn_bB_cO_{2-\alpha}F_\alpha$(0.90≤a≤1.8, 0≤b≤0.5, 0≤c≤0.05, 0≤α<2); $Li_aNi_{1-b-c}Mn_bB_cO_{2-\alpha}F_2$ (0.90≤a≤1.8, 0≤b≤0.5, 0≤c≤0.05, 0≤α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (wherein, in the above chemical formula, 0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A may be Ni, Co, Mn, or a combination thereof; B may be Al, Ni, Co, Mn, Cr, Fe, Mg, Sr, V, a rare earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The binder may help improve binding properties of positive active material particles with one another and with a current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like.

The conductive material may help improve conductivity of an electrode. A suitable electrically conductive material that does not cause a chemical change may be used as a conductive material. Examples of the conductive material may include a carbon-based material such as natural graphite, artificial graphite, carbon black, acetylene black, ketjen black, carbon fiber and the like; a metal-based material such as a metal powder or a metal fiber and the like of copper, nickel, aluminum, silver, and the like; a conductive polymer such as a polyphenylene derivative and the like; or a mixture thereof.

In an implementation, the positive electrode and negative electrode may be manufactured by mixing each active material, a conductive material, and a binder in a solvent to prepare an active material composition, and applying the composition on a current collector. The solvent may include N-methylpyrrolidone or the like. When the binder is an aqueous binder, water may be used.

The electrolyte solution may include an organic solvent and a lithium salt.

A non-aqueous organic solvent may serve as a medium for transmitting ions taking part in the electrochemical reaction of a battery. The organic solvent may include a carbonate-based, ester-based, ether-based, ketone-based, alcohol-based, or aprotic solvent.

The carbonate-based solvent may include, e.g., dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), or the like.

For example, when the linear carbonate compounds and cyclic carbonate compounds are mixed, an organic solvent having a high dielectric constant and a low viscosity may be provided. The cyclic carbonate and the linear carbonate may be mixed together in a volume ratio ranging from about 1:1 to 1:9.

In an implementation, the ester-based solvent may include, e.g., methylacetate, ethylacetate, n-propylacetate, dimethylacetate, methylpropionate, ethylpropionate, γ-butyrolactone, decanolide, valerolactone, mevalonolactone, caprolactone, or the like. The ether solvent may include, e.g., dibutylether, tetraglyme, diglyme, dimethoxyethane, 2-methyltetrahydrofuran, tetrahydrofuran, or the like, and the ketone-based solvent may include, e.g., cyclohexanone, or the like. In an implementation, the alcohol-based solvent may include, e.g., ethanol, isopropyl alcohol, or the like.

The organic solvent may be used singularly or in a mixture, and when the organic solvent is used in a mixture, the mixture ratio may be controlled in accordance with a desirable battery performance.

In an implementation, the electrolyte solution may further include an overcharge inhibitor additive, e.g., ethylene carbonate, pyrocarbonate, or the like.

The lithium salt may be dissolved in an organic solvent, may supply lithium ions in a battery, may basically operates the rechargeable lithium battery, and may help improve lithium ion transportation between positive and negative electrodes therein.

Examples of the lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, e.g., an integer of 1 to 20, LiCl, LiI, $LiB(C_2O_4)_2$ (lithium bis(oxalato)borate, LiBOB), or a combination thereof.

The lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

The separator 30 may include a suitable material for a lithium battery that separates the negative electrode from the positive electrode and provides a transporting passage for lithium ion. For example, the separator may have a low resistance to ion transportation and an excellent impregnation for an electrolyte. The separator may include, e.g., glass fiber, polyester, polyethylene, polypropylene, polytetrafluoroethylene (PTFE), or a combination thereof. The separator may have a form of a non-woven fabric or a woven fabric. For example, a polyolefin-based polymer separator such as polyethylene, polypropylene, or the like may be used for a lithium ion battery. In order to ensure the heat resistance or mechanical strength, a coated separator including a ceramic component or a polymer material may be used. In an implementation, it may have a mono-layered or multi-layered structure.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

(Preparation of Negative Active Material)

Example 1

A silicon-graphite composite precursor was obtained by mixing 54 wt % of natural graphite (made by BTR) having an average particle diameter of 10 μm, 15 wt % of a Si particle (made by BTR) having an average particle diameter of 100 nm, and 8 wt % of coal-based pitch in 23 wt % of an ethanol solvent, and drying the mixture to prepare a silicon-graphite composite precursor. Subsequently, the silicon-graphite composite precursor was put in a mold and compression-formed by pressing with a pressure of 5 MPa, obtaining a silicon-graphite composite. The silicon-graphite composite was ground into a size of 13 μm by milling. Subsequently, 90 wt % of the ground silicon-graphite composite was mixed with 10 wt % of coal-based pitch, and the mixture was fired at 850° C. under an $N_2$ atmosphere for 2 hours, preparing a negative active material having a coating layer surrounding the silicon-graphite composite. The coating layer was 0.5 μm thick.

Example 2

A negative active material was prepared according to the same method as Example 1 except for using expanded graphite instead of the natural graphite. The expanded graphite was prepared by milling with graphite by using a ball for 20 hours in an expansion process.

Example 3

A negative active material was prepared according to the same method as Example 1 except for using expanded graphite instead of the natural graphite. The expanded graphite was prepared by milling with graphite by using a ball for 10 hours in an expansion process.

Comparative Example 1

58 wt % of natural graphite having an average particle diameter of 10 μm was mixed with 17 wt % of an Si particle (made by BTR) having an average particle diameter of 100 nm in 25 wt % of an ethanol solvent, and the mixture was dried to prepare a silicon-graphite composite. Subsequently, the silicon-graphite composite was ground into a size of 14 μm by milling. Then, the obtained silicon-graphite composite was used to prepare a negative active material according to the same method as Example 1.

Comparative Example 2

58 wt % of an expanded graphite having an average particle diameter of 10 μm was mixed with 17 wt % of an Si particle (made by BTR) having an average particle diameter of 100 nm in 25 wt % of an ethanol solvent, and the mixture was dried to prepare a silicon-graphite composite. The expanded graphite was prepared by milling with graphite by using a ball for 10 hours in an expansion process. The resultant silicon-graphite composite was used as a negative active material.

(Manufacture of Rechargeable Lithium Battery Cell)

98 wt % of each negative active material according to Examples 1 to 3 and Comparative Examples 1 and 2 was respectively mixed with 1 wt % of carboxylmethyl cellulose and 1 wt % of a styrene-butadiene rubber in distilled water to prepare slurry. The slurry was coated on a Cu thin film and then, dried and compressed, manufacturing a negative electrode.

A positive electrode was manufactured by mixing 96 wt % of $LiCoO_2$, 2 wt % of polyvinylidene fluoride (PVdF), and 2 wt % of carbon black in N-methylpyrrolidone to prepare a slurry, coating the slurry on an Al thin film and then, drying and compressing.

The negative and positive electrodes, a separator formed of a polyethylene material and an electrolyte solution were used to manufacture a rechargeable lithium battery cell. Herein, the electrolyte solution was prepared by mixing ethylene carbonate (EC), diethyl carbonate (DEC) and dimethyl carbonate (DMC) in a volume ratio of 2:1:7 to prepare an organic solvent, dissolving $LiPF_6$ therein to form a 1.5 M $LiPF_6$ solution, and adding 3 parts by weight of fluoroethylene carbonate (FEC) in 100 parts by weight of the organic solvent.

Evaluation 1: Si Inclusion Ratio and Specific Surface Area of Negative Active Material Each Si inclusion ratio and specific surface area of the negative active materials according to Examples 1 to 3 and Comparative Examples 1 and 2 were measured, and the results are provided in the following Table 1.

In Table 1, the total amount of Si indicates the amount of Si totally included inside and on the surface of the negative active material and was measured through an X-ray fluorescence (XRF) analyzer.

The amount of Si on the surface of the graphite particle indicates the amount of Si particles present on the surface of graphite particles was measured through an energy disperse X-ray spectrometer (EDX).

The total amount, wt %, of Si and the amount, wt %, of Si on the surface of the graphite particle are based on the total weight of the negative active material.

The Si inclusion ratio was obtained as the amount of Si present inside a silicon-graphite composite relative to the total amount of Si present inside and on the surface of the silicon-graphite composite, and the specific surface area was obtained by measuring a BET surface area in a gas adsorption/desorption method.

TABLE 1

|  | Total amount of Si (wt %) | Si amount on the surface of graphite particle (wt %) | Si Inclusion ratio (wt %) | Specific surface area (m²/g) |
|---|---|---|---|---|
| Example 1 | 16.8 | 8.9 | 47 | 4.2 |
| Example 2 | 16.7 | 8.2 | 50.9 | 3.8 |
| Example 3 | 16.8 | 9.4 | 44 | 3.7 |
| Comparative Example 1 | 16.8 | 15.5 | 8 | 15.4 |
| Comparative Example 2 | 16.8 | 10.4 | 38 | 11.5 |

Referring to Table 1, the negative active materials manufactured by the compression-forming method according to Examples 1 to 3 exhibited a higher inclusion ratio and smaller pores due to the compression-forming and thus, a smaller specific surface area than the negative active material manufactured without compression-forming according to Comparative Example 1.

Evaluation 2: SEM Analysis of Negative Active Material

Figure 4A:
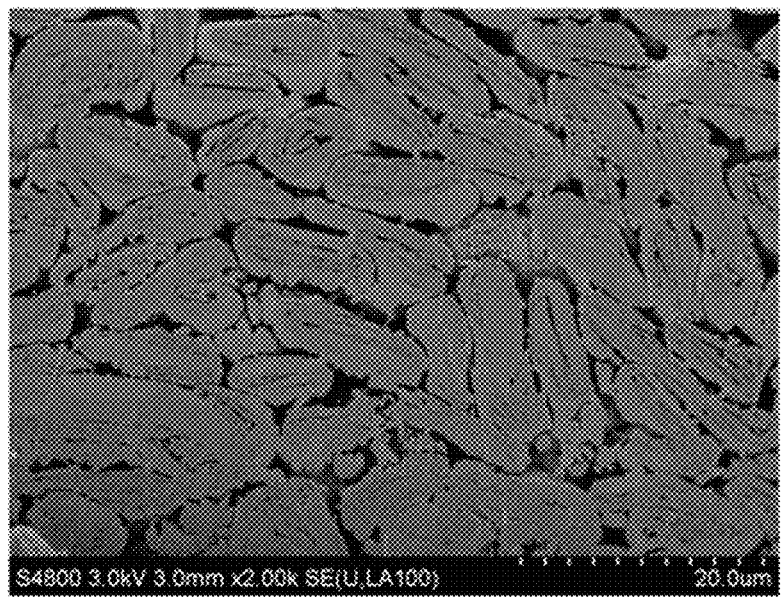
FIG. 4A illustrates a scanning electron microscope (SEM) image of the graphite particle used in Example 1.
Figure 4B:
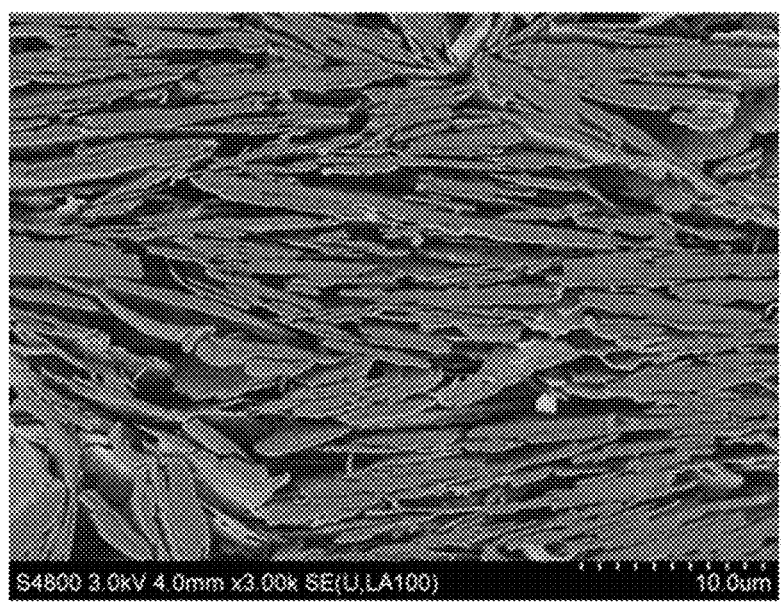
FIG. 4B illustrates a scanning electron microscope (SEM) image of the graphite particle used in Example 2.

FIG. 4A illustrates a scanning electron microscope (SEM) image of the graphite particle of Example 1, and FIG. 4B illustrates a scanning electron microscope (SEM) image of the graphite particle of Example 2.

Referring to FIGS. 4A and 4B, the graphite particles used in Example 2 were expanded graphite manufactured in an expansion process.

Figure 5:
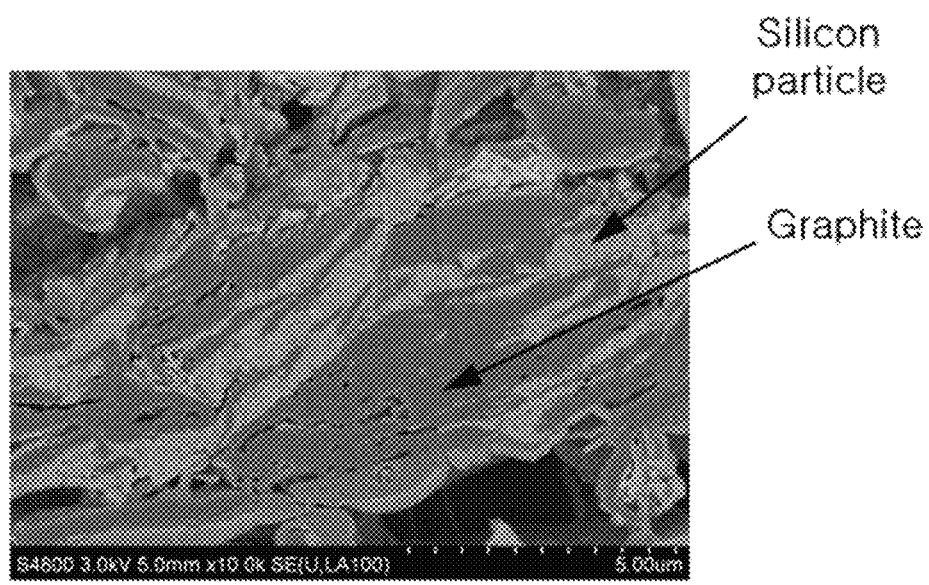
FIG. 5 illustrates a scanning electron microscope (SEM) image of a cross-section of the negative active material for a rechargeable lithium battery according to Example 1.
Figure 6:
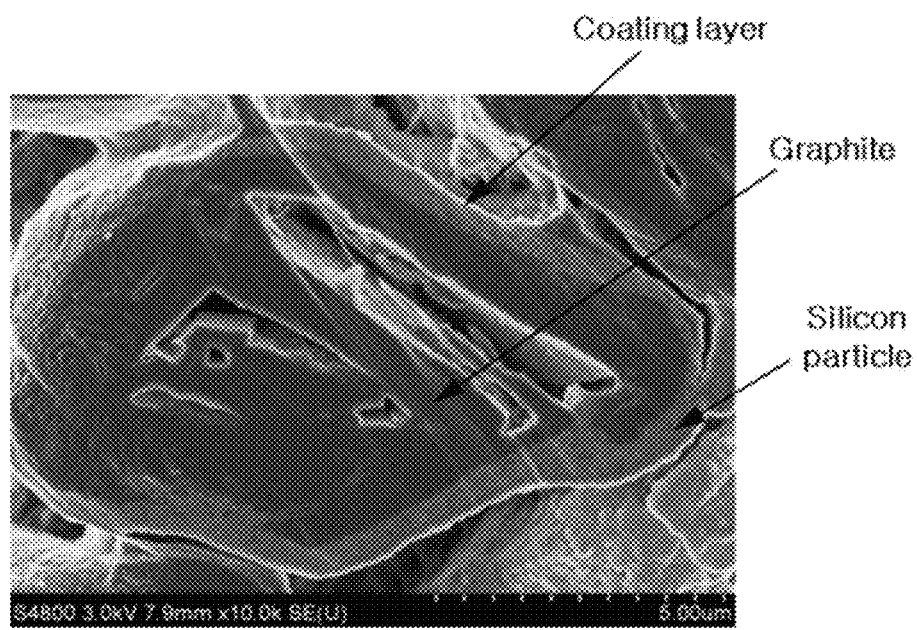
FIG. 6 illustrates a scanning electron microscope (SEM) image of a cross-section of the negative active material for a rechargeable lithium battery according to Comparative Example 1.
Figure 7:
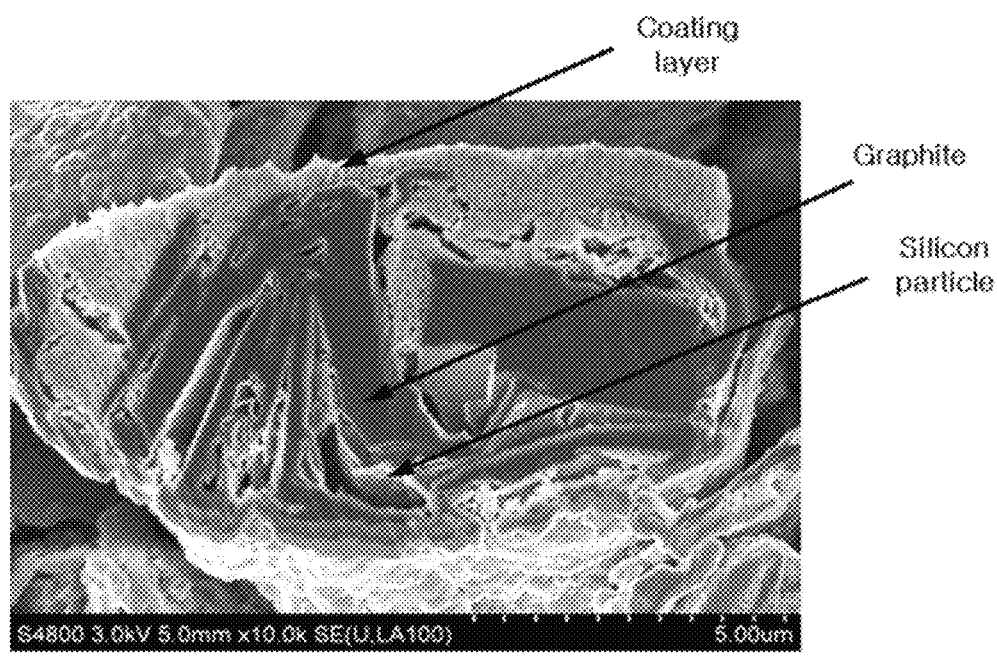
FIG. 7 illustrates a scanning electron microscope (SEM) image of a cross-section of the negative active material for a rechargeable lithium battery according to Comparative Example 2.

FIGS. 5 to 7 respectively illustrate scanning electron microscope (SEM) images of the cross-section of the negative active materials for a rechargeable lithium battery according to Example 1 and Comparative Examples 1 and 2.

Referring to FIGS. 5 and 6, the negative active material manufactured in a compression-forming method (according to Example 1) showed that Si particles were present inside the graphite particle. For example, Si particles were uniformly present in the internal core of the graphite particle. On the other hand, the negative active material manufactured without compression-forming (according to Comparative Example 1) showed that Si particles were present on the surface of the graphite particle.

In addition, in FIGS. 5 and 7, the negative active material manufactured without adding amorphous carbon (according to Comparative Example 2) showed that there was an empty space among Si particles, and the negative active material manufactured by adding amorphous carbon before the compression-forming (according to Example 1) showed that the amorphous carbon was filled among Si particles.

Evaluation 3: Initial Efficiency of Rechargeable Lithium Battery Cell

Initial efficiency of each rechargeable lithium battery cell according to Examples 1 to 3 and Comparative Examples 1 and 2 was measured, and the results are provided in the following Table 2.

The initial efficiency was measured by charging the cells at 0.2 C and 4.2 V and discharging them at 0.2 C and 2.5 V. In Table 2, the initial efficiency was calculated as a percentage of initial discharge capacity relative to initial charge capacity.

TABLE 2

|  | Initial efficiency (%) |
|---|---|
| Example 1 | 87 |
| Example 2 | 86.5 |
| Example 3 | 86.8 |
| Comparative Example 1 | 80 |
| Comparative Example 2 | 82.1 |

Evaluation 4: Cycle-life Characteristics of Rechargeable Lithium Battery Cell

The rechargeable lithium battery cells according to Examples 1 to 3 and

Figure 8:
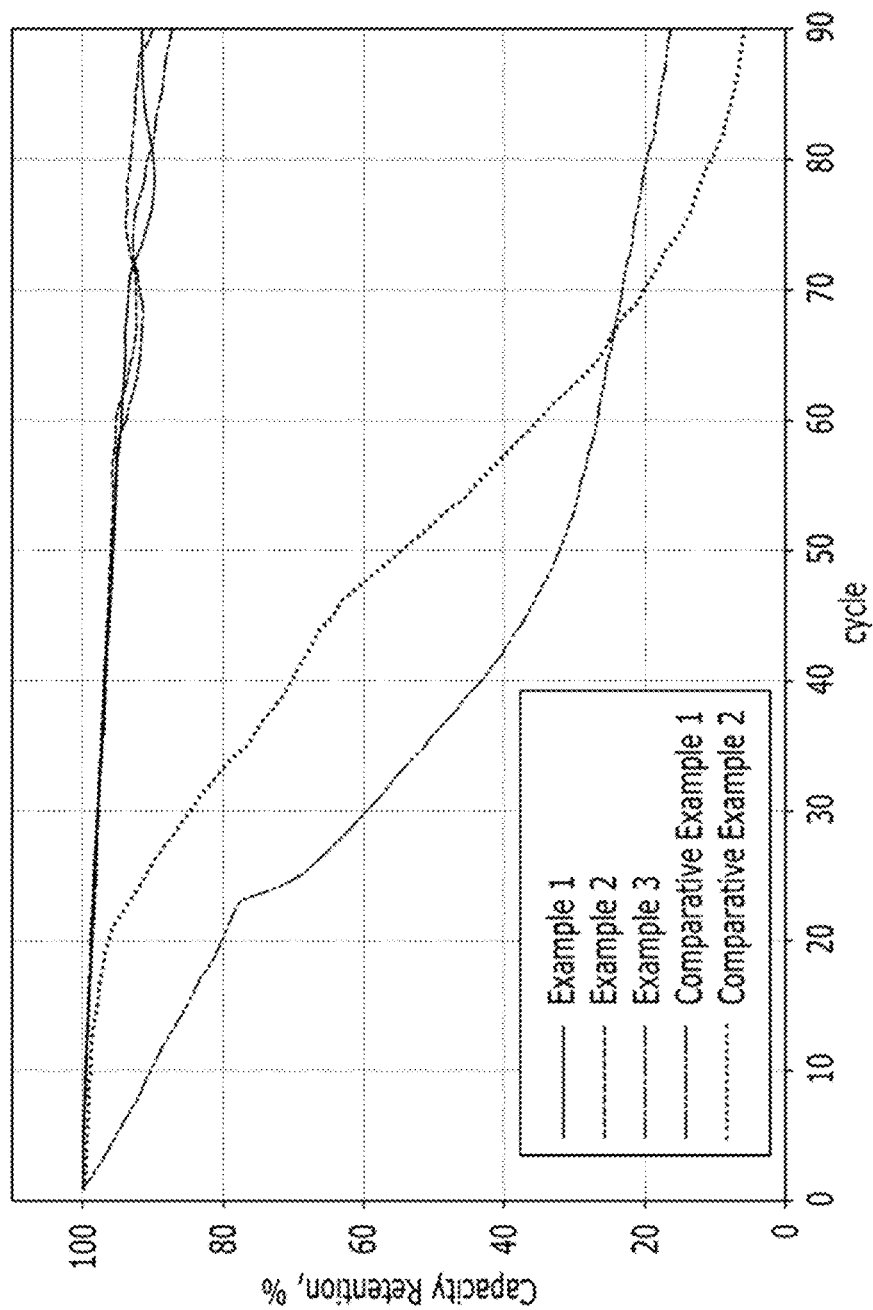
FIG. 8 illustrates a graph showing cycle-life characteristics of the rechargeable lithium battery cells according to Examples 1 to 3 and Comparative Examples 1 and 2.

Comparative Examples 1 and 2 were respectively charged and discharged under the conditions, their cycle-life characteristics were evaluated, and the results are provided in FIG. 8.

The charge was performed at 0.5 C and 4.2 V, and the discharge was performed at 0.5 C and 2.5 V.

FIG. 8 illustrates a graph showing cycle-life characteristics of the rechargeable lithium battery cells according to Examples 1 to 3 and Comparative Examples 1 and 2.

Referring to FIG. 8, the rechargeable lithium battery cells manufactured in a compression-forming process according to Examples 1 to 3 showed excellent cycle-life characteristics, compared with the rechargeable lithium battery cell manufactured without compression-forming (according to Comparative Example 1) and the rechargeable battery cell prepared without the addition of amorphous carbon before compression-forming (according to Comparative Example 2).

Evaluation 5: Storage Characteristics of Rechargeable Lithium Battery Cell at High Temperature The rechargeable lithium battery cells according to Examples 1 to 3 and Comparative Examples 1 and 2 were respectively stored at 60° C. for 10 days, their recovery capacities after the storage were measured, and the results are shown in FIG. 9.

The charge was performed at 0.5 C and 4.2 V, and the discharge was performed at 0.5 C and 2.5 V.

Figure 9:
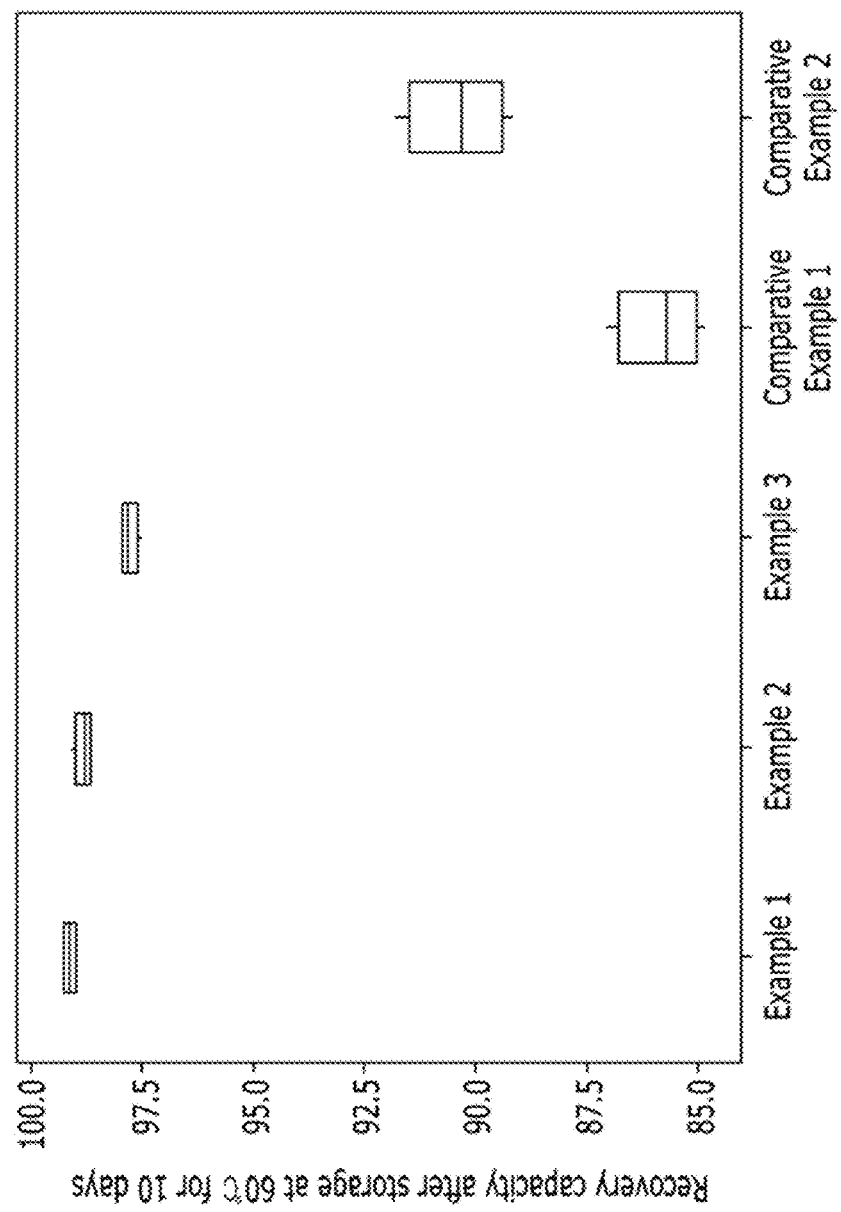
FIG. 9 illustrates a graph showing storage characteristics at a high temperature of the rechargeable lithium battery cells according to Examples 1 to 3 and Comparative Examples 1 and 2.

FIG. 9 illustrates a graph showing storage characteristics of the rechargeable lithium battery cells according to Examples 1 to 3 and Comparative Examples 1 and 2 at a high temperature.

Referring to FIG. 9, the rechargeable lithium battery cells manufactured in a compression-forming method according to Examples 1 to 3 showed excellent storage characteristics at a high temperature, compared with the rechargeable lithium battery cell manufactured without compression-forming (according to Comparative Example 1) and the rechargeable lithium battery cell manufactured without adding amorphous carbon before the compression-forming (according to Comparative Example 2).

Evaluation 6: Expansion Characteristics of Negative Electrode

The rechargeable lithium battery cells according to Examples 1 to 3 and

Figure 10:
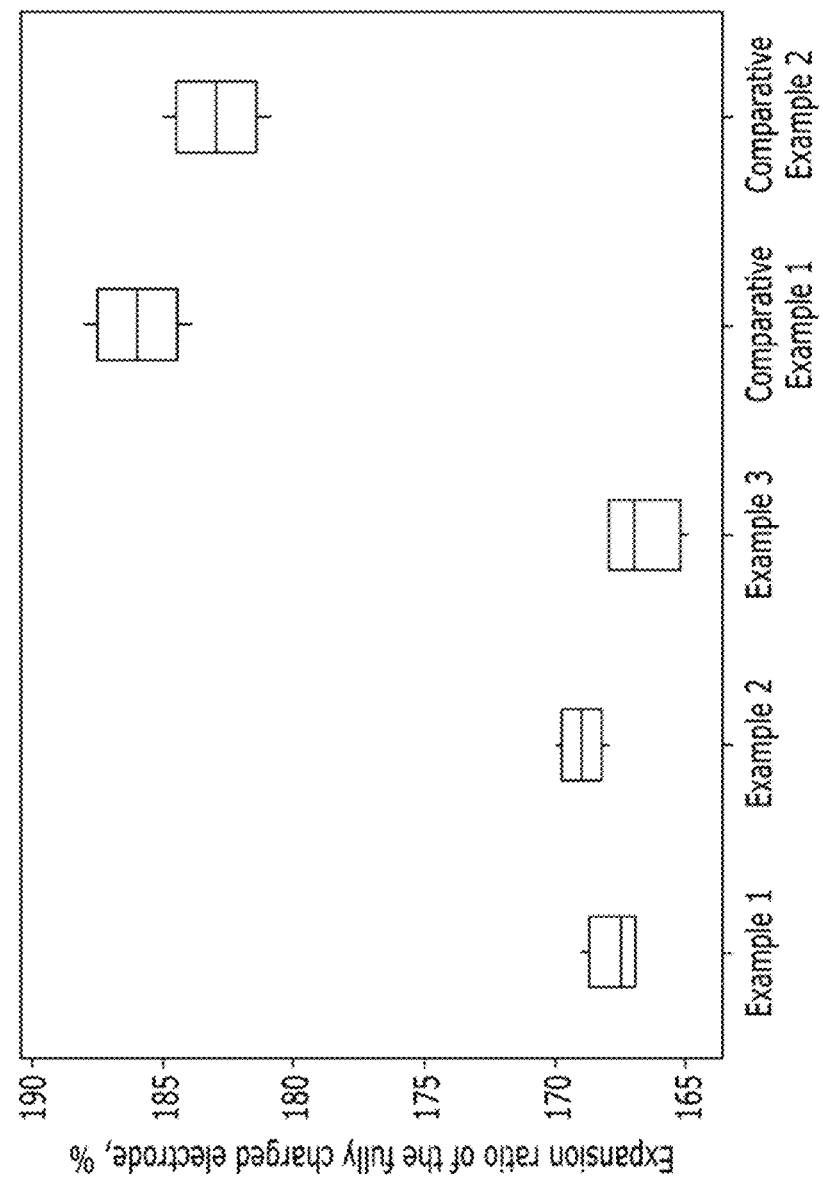
FIG. 10 illustrates a graph showing expansion ratios of the negative electrodes according to Examples 1 to 3 and Comparative Examples 1 and 2.

Comparative Examples 1 and 2 were respectively charged and discharged under the following condition, expansion ratio of negative electrodes therein was measured, and the results are provided in FIG. 10.

The charge was performed at 0.5 C and 4.2 V, and the discharge was performed at 0.5 C and 2.5 V.

FIG. 10 illustrates a graph showing expansion ratios of the negative electrodes according to Examples 1 to 3 and Comparative Examples 1 and 2.

Referring to FIG. 10, the rechargeable lithium battery cells manufactured in a compression-forming method according to Examples 1 to 3 exhibited a small expansion ratio of each electrode plate, compared with the rechargeable lithium battery cell manufactured without compression-forming (according to Comparative Example 1) and the rechargeable lithium battery cell manufactured without adding amorphous carbon before compression-forming (according to Comparative Example 2).

Accordingly, the negative active material according to an embodiment may show that a volume expansion due to Si particles is minimized and thus, may contribute to realization of a rechargeable lithium battery cell having excellent cycle-life characteristics and storage characteristics at a high temperature.

By way of summation and review, negative active materials of a rechargeable lithium battery may include various carbon-based materials such as artificial graphite, natural graphite, and hard carbon. A negative active material may include a metal-based or metalloid-based material to accomplish high-capacity of a rechargeable lithium battery. Theoretical capacity of the metal-based material may be difficult to use up to 100%, and the metal-based material may be mixed with a carbon-based material.

The metal-based or metalloid-based material including, e.g., silicon, tin, or the like, may have expand during charging, and may experience cycle-life degradation and resistance increase due to high reactivity with an electrolyte solution.

The embodiments may provide a negative active material for a rechargeable lithium battery capable of minimizing an electrode expansion ratio and having excellent cycle-life characteristics and storage characteristics at a high temperature.

The rechargeable lithium battery according to an embodiment may minimize an electrode expansion ratio and has excellent cycle-life characteristics and storage characteristics at a high temperature.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A negative active material for a rechargeable lithium battery, the negative active material comprising a silicon-graphite composite,
wherein the silicon-graphite composite includes:
a graphite particle,
a silicon particle inside the graphite particle,
a silicon particle on a surface of the graphite particle, and
amorphous carbon inside the graphite particle,
wherein an amount of the silicon particle inside the graphite particle is about 30 wt % to about 70 wt %, based on a total weight of the silicon particles present inside and on the surface of the graphite particle.

2. The negative active material for a rechargeable lithium battery as claimed in claim 1, wherein a total amount of the silicon particle present inside and on the surface of the graphite particle is about 15 wt % to about 60 wt %, based on a total weight of the silicon-graphite composite.

3. The negative active material for a rechargeable lithium battery as claimed in claim 1, wherein the graphite particle includes expanded graphite.

4. The negative active material for a rechargeable lithium battery as claimed in claim 1, wherein the amorphous carbon inside the graphite particle is included in an amount of about 5 wt % to about 40 wt %, based on a total weight of the silicon-graphite composite.

5. The negative active material for a rechargeable lithium battery as claimed in claim 1, further comprising a coating layer surrounding the silicon-graphite composite, wherein the coating layer includes amorphous carbon.

6. The negative active material for a rechargeable lithium battery as claimed in claim 1, wherein the negative active material has a specific surface area of about 1 $m^2/g$ to about 10 $m^2/g$.

7. A rechargeable lithium battery comprising a negative electrode, the negative electrode including the negative active material as claimed in claim 1.

8. A method of preparing the negative active material for a rechargeable lithium battery as claimed in claim 1, the method comprising:
mixing a graphite particle raw material, a silicon particle raw material, and an amorphous carbon raw material to obtain a silicon-graphite composite precursor; and compression-forming the silicon-graphite composite precursor to obtain the silicon-graphite composite.

9. The method as claimed in claim 8, wherein the compression-forming includes pressing the silicon-graphite composite precursor at a pressure of about 2 MPa to about 10 MPa.

10. The method as claimed in claim 8, wherein the graphite particle includes expanded graphite.

11. The method as claimed in claim 10, wherein the expanded graphite is prepared by performing an expansion process for about 1 hour to about 20 hours.

12. The method as claimed in claim 8, further comprising:
mixing the silicon-graphite composite and amorphous carbon raw material to obtain a mixture; and
firing the mixture such that a coating layer is formed on the silicon-graphite composite.

13. The method as claimed in claim 8, wherein:
the graphite particle has an average particle diameter of about 5μm to about 20 μm, and
the silicon particle has an average particle diameter of about 50 nm to about 300 nm.

14. The method as claimed in claim 8, wherein the amorphous carbon raw material includes sucrose, methylene diphenyl diisocyanate, polyurethane, a phenolic resin, a naphthalene resin, polyvinyl alcohol, polyvinylchloride, furfuryl alcohol, polyacrylonitrile, polyamide, furan resin, cellulose, styrene, polyimide, an epoxy resin, a vinyl chloride resin, coal-based pitch, petroleum-based pitch, mesophase pitch, tar, low molecular weight heavy oil, or a combination thereof.

* * * * *